United States Patent [19]

van Hout

[11] Patent Number: 5,210,173

[45] Date of Patent: May 11, 1993

[54] CATALYTIC, INTERFACIAL PREPARATION OF AROMATIC POLYCARBONATES WITH CONTINUOUS DOSING OF CARBONATE PRECURSOR

[75] Inventor: Henricus H. M. van Hout, Halsteren, Netherlands

[73] Assignee: General Electric Company, Pittsfield, Mass.

[21] Appl. No.: 878,788

[22] Filed: May 5, 1992

[30] Foreign Application Priority Data

Jun. 24, 1991 [NL] Netherlands ..................... 9101081

[51] Int. Cl.⁵ .......................................... C08G 64/24
[52] U.S. Cl. ................................... 528/199; 528/171; 528/174; 528/196; 528/198; 528/202; 528/204
[58] Field of Search ............. 528/199, 200, 198, 196, 528/202, 204, 171, 174

[56] References Cited

U.S. PATENT DOCUMENTS

| 4,368,315 | 1/1983 | Sikdar | 528/198 |
| 4,384,108 | 5/1983 | Campbell et al. | 528/199 |
| 4,529,791 | 7/1985 | Glass | 528/199 |
| 4,558,118 | 12/1985 | Sikdar | 528/199 |
| 4,789,730 | 12/1988 | Priddy | 528/498 |

Primary Examiner—Harold D. Anderson

[57] ABSTRACT

The invention relates to a method of preparing aromatic polycarbonates by catalytic interface polymerization of at least one bivalent phenol and a carbonyl halide in the presence of a polycondensation catalyst, which method is characterized in that the conversion is carried out in a two-phase system with continuous dosing of the carbonyl halide, which two-phase system is based on water and an organic solvent, in which the quantity of organic solvent at the beginning of the polycondensation lies between 10% and 75% of the quantity of organic solvent which is required at the polymerization temperature for dissolving the quantity of polycarbonate which may be formed from the quantity of bivalent phenol which is present at the beginning of the polycondensation, in that after dosing at least 20% of the carbonyl halide a remaining quantity of organic solvent is added which is at least sufficient to keep the formed polycarbonate in solution.

9 Claims, No Drawings

CATALYTIC, INTERFACIAL PREPARATION OF AROMATIC POLYCARBONATES WITH CONTINUOUS DOSING OF CARBONATE PRECURSOR

The present invention relates to a method of preparing aromatic polycarbonates by catalytic interface polymerisation of at least one bivalent phenol with a carbonyl derivative in the presence of a polycondensation catalyst. Such a method is known from various publications, including U.S. Pat. Nos. 3,028,365 and 3,943,101. During the polycondensation polycarbonate is formed which dissolves in an organic phase.

For a number of applications of polycarbonate it is of importance that the content of oligomers and more in particular the content of cyclic oligomers is as low as possible. An example of such an application is the manufacture of compact discs. A low content of oligomers is also of importance for the extrusion of polycarbonate. A number of suggestions have already been made to obtain polycarbonate having a low content of oligomers. All these suggestions are based on the subsequent removal of the formed oligomers from the polycarbonate. An example of such a method is described in U.S. Pat. No. 4,789,730. A disadvantage of all these methods is that it requires an extra treatment of the polycarbonate, which is economically unattractive.

Therefore, there exists a need for a method in which the formation of oligomers does not take place or is suppressed to such an extent that these are no longer annoying during the processing of the polycarbonate.

U.S. Pat. No. 4,529,791 describes a two step process for the inferfacial preparation of polycarbonates, in which the solvent is added in several portions. During the first step, no polycondensation catalyst is present. After the first step (oligomerisation reaction) one adds a second portion of solvent before the second step (polycondensation reaction) is initiated by adding the polycondensation catalyst. This process is claimed to result in a polycarbonate resin with a reduced yellowness index and increased light transmittance.

The present invention aims at reducing the level of oligomers, in particular cyclic oligomers, present in the final polymeric product. It is highly unlikely that cyclic oligomers are formed in the first reaction step of U.S. Pat. No. 4,529,791 due to the absence of (sufficient quantity of) polycondensation catalyst. Said oligomers are formed during the polycondensation reaction. It has been found that a lower content thereof is present in the final product in case the beginning of the polycondensation reaction is carried out in the presence of a relative small amount of the organic solvent.

The invention relates to a method of preparing aromatic polycarbonates by catalytic interface polymerisation of at least one bivalent phenol and a carbonyl derivative in the presence of a polycondensation catalyst, wherein the conversion is carried out in a two-phase system with continuous dosing of the carbonyl derivative, which two-phase system is based on water and an organic solvent, in which the quantity of organic solvent at the beginning of the polycondensation lies between 10% and 75% of the quantity of organic solvent which is required at the polymerisation temperature to dissolve the quantity of polycarbonate which may be formed from the quantity of bivalent phenol which is present at the beginning of the polycondensation, in that after dosing at least 20% of the carbonyl derivative the remaining quantity of organic solvent is added in a quantity which is at least sufficient to keep the formed polycarbonate in solution and wherein the polycondensation catalyst is present from the beginning of the reaction in a sufficient quantity to achieve polycondensation. After termination of the polycondensation the polycarbonate may be separated.

Experiments have demonstrated that such a method results in a product which has a clearly reduced content of oligomers, more in particular a clearly reduced content of cyclic oligomers, as compared with a method in which the total quantity of organic solvent has been used already at the beginning. The method according to the invention can be implemented in a particularly simple manner in existing plants, without this requiring expensive or complicated adaptations. The method can also be carried out simply. The process control of the method according to the invention can also be applied simply and without any problems in existing plants.

Essential for the method according to the invention is the subsequent addition of a quantity of solvent so as to prevent precipitation of the polycarbonate. During the whole polycondensation the quantity of organic solvent should be kept so high that the formed polycarbonate remains in solution. It is also essential, however, for the quantity of organic solvent to be kept as low as possible during the first cycle of the polycondensation. The addition of the remaining quantity of solvent may be done either in one time, or dosed in the form of a number of portions or continuously.

It is to be noted that Netherlands Patent Application 8201724 discloses a method in which so little solvent is used that formed polycarbonate precipitates. According to this method, however, extra solvent is not added during the polycondensation.

According to a preferred embodiment of the method according to the invention the addition of the remaining quantity of the organic solvent is done after at least 50%, more in particular at least 75%, of the carbonyl derivative such as a carbonyl halide have been added. The addition of the remaining quantity of organic solvent should preferably be completed before 95% of the carbonyl halide have been added.

The method according to the invention is preferably carried out in a batch process, although it may also be carried out semi-continuously or continuously. The compounds and auxiliary substances conventionally used for the preparation of polycarbonate are used in the method according to the invention. A survey thereof is given, inter alia, in the already mentioned United States Patent Specifications the contents of which are incorporated herein by reference.

The preparation of polycarbonate is preferably carried out under the conditions of temperature, pH and pressure known therefor. Such conditions include a temperature of 25° to 70° C., a pH of 8 to 12 and a pressure from atmospheric pressure to approximately 4 bar.

The ultimate ratio of the two phases does in general not deviate from what is usual in the polycondensastion reaction, i.e. that the ratio water/solvent lies between 0.9 and 1.4 on a volume basis. This ratio has been calculated with reference to the overall quantity of solvent, i.e. at the end of the reaction.

Suitable solvents are inter alia dichloromethane and monochlorobenzene, dichloromethane being preferred. As bivalent phenols may be used, inter alia, bis(4-hydroxy phenyl) methane, 2,2-bis(4-hydroxyphenyl)propane(bisphenol A), 2,2-bis(4-hydroxy-3-methylphenyl)propane,
4,4-bis(4-hydroxyphenyl)heptane,
2,2-bis(4-hydroxy-3,5-dichlorophenyl)-propane,
2,2-bis(4-hydroxy-3,5-dibromophenyl)propane,
bis(4-hydroxyphenyl)ether,
bis(3,5-dichloro-4-hydroxyphenyl)ether,
p,p'-dihydroxydiphenyl),
3,3'-dichloro-4,4'-dihydroxydiphenyl,
bis(4-hydroxyphenyl)sulphone,
bis(3,5-dimethyl-4-hydroxyphenyl)sulphone, dihydroxybenzenes, resorcinol, hydroquinone, halo- and-/or alkyl-substituted dihydroxybenzenes, for example,
1,4-dihydroxy-2,5-dichlorobenzene,
1,4-dihydroxy-3-methylbenzene,
bis(4-hydroxyphenyl)sulphoxide and
bis(3,5-dibromo-4-hydroxyphenyl)sulphoxide, as well as combinations of two or more of these phenols. The use of bisphenol A, optionally in combination with one or more other bivalent phenols, is to be preferred. For the preparation a minor quantity of a trivalent or multivalent phenol and/or another trivalent or multivalent monomer may optionally be used to obtain branched but still thermoplastic polycarbonates.

When using bisphenol A and dichloromethane, the quantity of dichloromethane at the beginning of the polycon-densation is preferably between 25 and 200 ml per 100 g of bisphenol A, while after dosing at least 20% of the carbonyl derivative, this quantity is completed to at least 250 ml per 100 g of bisphenol A.

Phosgene is preferably used as a carbonylderivative, although it is also possible to use other carbonyl derivatives known for polycarbonate.

During the polycondensation a chain stopper may be used, for example, optionally substituted phenols, for example, phenol, p-cumylphenol, p-t-butylphenol, p-bromophenol, phenolchloroformiates, aliphatic and/or aromatic carboxylic acids and/or derivatives thereof, for example, benzoic acid or acetic acid. The quantity thereof generally is from 0.5 to 10% by weight of the quantity of bivalent phenol.

Suitable polycondensation catalysts are inter alia the various tertiary amines as described in U.S. Pat. No. 3,943,101. A tertiary amine or an alkali metal hydroxide, for example, sodium hydroxide or potassium hydroxide, is preferably also used during the polycondensation.

The invention will now be described in greater detail with reference to a few specific examples

EXAMPLES

Comparative example 1450 ml of dichloromethane, 420 g of bisphenol A, 800 ml of water and triethyl amine were mixed. Phosgene was added at a temperature of 25° C., in a quantity corresponding to 115% of the stoichiometric quantity calculated with respect to the bisphenol A. 8.0 g of phenol were used as a chain stopper. A polycarbonate was thus obtained.

The polycarbonate obtained in this manner—comparative product—comprised the quantities of cyclic oligomers recorded in the Table (determined by means of high pressure liquid chromatography, HPLC).

EXAMPLE 1

In the manner described in the comparative example a polycarbonate was prepared in which, however, 725 ml of dichloromethane were used at the beginning of the polymerisation. After the addition of 85% of the phosgene, 725 ml of dichloromethane were added in one portion. The properties of the polycarbonate are recorded in the Table.

EXAMPLE 2

A polycarbonate was prepared in the manner described in Example I in which 650 ml of dichloromethane were used at the beginning of the polymerisation. After the addition of 80% of the phosgene, 650 ml of dichloromethane were added in one portion. The properties of the polycarbonate are recorded in the Table.

EXAMPLE 3

In the manner described in Example 1 a polycar bonate was prepared, in which 450 ml of dichloromethane were used at the beginning of the polymerisation. After the addition of 60% of the phosgene, 200 ml of dichloromethane were added and, after the addition of 80% phosgene, 450 ml of dichloromethane were added. The properties of the polycarbonate are recorded in the table.

EXAMPLE 4

A polycarbonate was prepared in the manner described in Example 1, in which 450 ml of dichloromethane were used at the beginning of the polymerisation. After the addition of 80% of the phosgene, 700 ml of dichloromethane were added in one portion. The properties of the polycarbonate are recorded in the Table.

TABLE

| Example | Cyclic oligomers (peak surface/mg) |
| --- | --- |
| Comparative | 2190 |
| 1 | 1430 |
| 2 | 1510 |
| 3 | 1400 |
| 4 | 1400 |

I claim:

1. A method of preparing aromatic polycarbonates by catalytic interface polymerisation of at least one bivalent phenol and a carbonate precursor in the presence of a polycondensation catalyst, comprising polymerizing in a two-phase system with continuous dosing of the carbonate precursor, which two-phase system is based on water and an organic solvent, in which the quantity of organic solvent at the beginning of polymerization is between 10 and 75% of the quantity of organic solvent which is required at the polymerisation temperature to dissolve the quantity of polycarbonate formed from the quantity of bivalent phenol which is present at the beginning of the polymerization, in that after dosing at least 20% of the carbonate precursor the remaining quantity of organic solvent is added in a quantity which is at least sufficient to maintain formed polycarbonate in solution and wherein the polycondensation catalyst is present from the beginning of polymerization.

2. A method as claimed in claim 1, wherein dichloromethane or monochlorobenzene is an organic solvent.

3. A method as claimed in claim 1, wherein a compound selected from the group consisting of
bis(4-hydroxyphenyl)methane,
2,2-bis(4-hydroxyphenyl)propane (bisphenol A),
2,2-bis(4-hydroxy-3-methylphenyl)propane,
4,4-bis-(4-hydroxyphenyl)heptane,
2,2-bis(4-hydroxy-3,5-dichloro-phenyl)propane, 2,2-bis(4-hydroxy-3,5-dibromophenyl)propane,
bis(4-hydroxyphenyl)ether,
bis(3,5-dichloro-4-hydroxyphenyl)ether,
p,p'-dihydroxydiphenyl,
3,3'-dichloro-4,4'-dihydroxy-diphenyl,
bis(4-hydroxyphenyl)sulphone,
bis(3,5-dimethyl-4-hydroxyphenyl)sulphone, dihydroxybenzenes, halo- or alkyl-substituted dihydroxybenzenes,
bis(4-hydroxyphenyl)sulphoxide and bis (3,5-dibromo-4-hydroxyphenyl)sulphoxide, and combinations of two or more of these phenols, are a bivalent phenol.

4. A method as claimed in claim 1, wherein phosgene is carbonate precursor.

5. A method as claimed in claim 1, wherein dichloromethane is an organic solvent and bisphenol A is a bivalent phenol, in which the quantity of dichloromethane at the beginning of the polycondensation is between 25 and 200 ml per 100 g of bisphenol A, while after dosing of at least 50% of the carbonyl halide the said quantity is completed to at least 250 ml per 100 g of bisphenol A.

6. A method as claimed in claim 1, wherein the addition of the remaining quantity of organic solvent is added after dosing at least 50%, more in particular at least 75%, of the carbonate precursor.

7. A method as claimed in claim 1, wherein the addition of the remaining quantity of organic solvent is added before 95% of the carbonate precursor have been added.

8. A method as claimed in claim 1, wherein an aliphatic amine is a polycondensation catalyst.

9. A method as claimed in claim 1, wherein the ratio water/organic solvent, after termination of the addition, is between 0.9 and 1.4, on a volume basis.

* * * * *